United States Patent
Shin et al.

(10) Patent No.: US 8,862,317 B2
(45) Date of Patent: Oct. 14, 2014

(54) EMOTION-BASED VEHICLE SERVICE SYSTEM, EMOTION COGNITION PROCESSING APPARATUS, SAFE DRIVING APPARATUS, AND EMOTION-BASED SAFE DRIVING SERVICE METHOD

(75) Inventors: Hyun Soon Shin, Daejeon (KR); Yong Kwi Lee, Daejeon (KR); Jun Jo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 11 days.

(21) Appl. No.: 13/594,003

(22) Filed: Aug. 24, 2012

(65) Prior Publication Data
US 2013/0054090 A1 Feb. 28, 2013

(30) Foreign Application Priority Data
Aug. 29, 2011 (KR) .................. 10-2011-0086370

(51) Int. Cl.
G06F 7/00 (2006.01)
B60K 28/06 (2006.01)

(52) U.S. Cl.
CPC . B60K 28/06 (2013.01); Y02T 10/84 (2013.01)
USPC .......................................................... 701/36

(58) Field of Classification Search
USPC .......................................................... 701/36
See application file for complete search history.

(56) References Cited

U.S. PATENT DOCUMENTS

| 6,249,780 | B1 * | 6/2001 | Mizokawa | 706/23 |
|---|---|---|---|---|
| 6,430,523 | B1 * | 8/2002 | Mizokawa | 702/182 |
| 6,526,395 | B1 * | 2/2003 | Morris | 706/20 |
| 6,629,242 | B2 * | 9/2003 | Kamiya et al. | 713/100 |
| 6,757,593 | B2 * | 6/2004 | Mori et al. | 701/1 |
| 7,020,544 | B2 * | 3/2006 | Shinada et al. | 701/1 |
| 7,774,052 | B2 * | 8/2010 | Burton et al. | 600/544 |
| 8,195,593 | B2 * | 6/2012 | Jung et al. | 706/46 |
| 2003/0055654 | A1 * | 3/2003 | Oudeyer | 704/275 |
| 2005/0177290 | A1 * | 8/2005 | Farmer | 701/45 |
| 2007/0066916 | A1 * | 3/2007 | Lemos | 600/558 |
| 2007/0265507 | A1 * | 11/2007 | de Lemos | 600/300 |
| 2008/0284575 | A1 * | 11/2008 | Breed | 340/438 |
| 2009/0312998 | A1 * | 12/2009 | Berckmans et al. | 703/11 |
| 2011/0043635 | A1 * | 2/2011 | Fujita et al. | 348/149 |
| 2011/0083075 | A1 * | 4/2011 | Macneille et al. | 715/728 |
| 2011/0137486 | A1 | 6/2011 | Lim et al. | |
| 2012/0011477 | A1 * | 1/2012 | Sivadas | 715/866 |
| 2012/0150430 | A1 * | 6/2012 | French et al. | 701/425 |

FOREIGN PATENT DOCUMENTS

| JP | 2010-122732 A | 6/2010 |
|---|---|---|
| KR | 1020060066822 A | 6/2006 |
| KR | 1020100132592 A | 12/2010 |
| KR | 1020110060061 A | 6/2011 |
| KR | 1020110062970 A | 6/2011 |

* cited by examiner

Primary Examiner — Thomas Tarcza
Assistant Examiner — Alex C Dunn
(74) Attorney, Agent, or Firm — Ladas & Parry LLP

(57) ABSTRACT

An emotion-based vehicle service system for safe driving includes a multi-emotion sensor node configured to sense emotion information of a driver and passenger in a vehicle and condition information of the vehicle. The emotion-based vehicle service system further includes an emotion cognition processing apparatus configured to analyze sensing information provided from the multi-emotion sensor node to generate emotion cognition information, and a safe driving service apparatus configured to provide an emotion-based safe driving service depending on the emotion cognition information.

16 Claims, 13 Drawing Sheets

EMOTION-BASED VEHICLE SERVICE SYSTEM, EMOTION COGNITION PROCESSING APPARATUS, SAFE DRIVING APPARATUS, AND EMOTION-BASED SAFE DRIVING SERVICE METHOD

RELATED APPLICATION(S)

This application claims the benefit of Korean Patent Application No. 10-2011-0086370, filed on Aug. 29, 2011, which is hereby incorporated by reference as if fully set forth herein.

FIELD OF THE INVENTION

The present invention relates to a safe driving service technology for vehicle based on emotion of a user, and more particularly, to an emotion-based vehicle service system for safe driving, an emotion cognition processing apparatus for safe driving service, a safe driving service apparatus, and a safe driving service method for vehicle based on emotion, which cognize emotion information of a driver and passenger and condition information of a vehicle to provide a safe driving service.

BACKGROUND OF THE INVENTION

A worldwide life paradigm requires a specialized skill that is necessary for human assistants for enhancing the quality of life. Particularly, vehicles for providing a safe and convenient driving environment are demanded in a flood of vehicles that are modern life necessities, but a vehicle technique having creative and advanced concept that provides an emotion safe driving function based on emotion cognition is not proposed to date.

Especially, safe driving service technology for vehicles is required for automatically cognizing a vehicle-related crime, drunk driving, breakneck driving, an in-driving mobile phone call and the like that become social problems recently, and thus predicting and preventing the occurrence of a dangerous situation or a criminal situation.

SUMMARY OF THE INVENTION

In view of the above, the present invention provides a safe driving service technology for vehicle based on emotion cognition, which automatically cognizes the emotion of a driver and passenger and the condition of a vehicle, thus preventing the occurrence of a dangerous situation or a criminal situation.

Further, the present invention provides a safe driving service technology for vehicle based on emotion cognition, which provides a safe driving control and service based on cognized emotion information.

Embodiments relates to an emotion-based vehicle service system for safe driving, an emotion recognition processing apparatus for a safe driving service, a safe driving service method of a multi-emotion sensor node including a plurality of sensors, and a safe driving service method of an emotion-based safe driving service apparatus.

In the embodiments, an emotion-based vehicle service system for safe driving includes: a multi-emotion sensor node configured to sense emotion information of a driver and passenger in a vehicle and condition information of the vehicle; an emotion cognition processing apparatus configured to analyze sensing information provided from the multi-emotion sensor node to generate emotion cognition information; and a safe driving service apparatus configured to provide an emotion-based safe driving service depending on the emotion cognition information.

In the embodiments, the multi-emotion sensor node is constituted with at least one of a handle sensor node, a driver seat sensor node, a passenger seat sensor node, a transmission sensor node, a ceiling sensor node, and a front glass sensor node.

In the embodiments, the multi-emotion sensor node includes at least one of a heart rate sensor, a skin reaction sensor, a body temperature sensor, a voice sensor, an image sensor, an acceleration sensor, and a slope sensor.

In the embodiments, the emotion cognition processing apparatus is further configured to combine the emotion information of the user and the condition information of the vehicle for analyzing the combined emotion information and the condition information to cognize the emotion of the user.

In the embodiments, the emotion recognition processing apparatus for a safe driving service includes: an emotion cognition unit configured to cognize emotion information of a driver and passenger in a vehicle; and a vehicle condition cognizing unit configured to cognize condition information of the vehicle.

The emotion cognition unit includes: a multi-bio signal-based emotion signal analyzer configured to analyze information necessary for cognizing emotion on the basis of bio signals which have been sensed through multiple channels; an image-based emotion signal analyzer configured to analyze information necessary for cognizing emotion on the basis of image signals which have been sensed through the multiple channels; a voice-based emotion signal analyzer configured to analyze information necessary for cognizing emotion on the basis of voice signals which have been sensed through the multi-channels; a motion-based emotion signal analyzer configured to analyze information necessary for recognizing emotion on the basis of motion signals which have been sensed through the multi-channels; a smell recognition-based emotion signal analyzer configured to analyze information necessary for cognizing emotion on the basis of smell information which has been sensed through the multi-channels; a temperature/humidity signal analyzer configured to analyze information necessary for recognizing emotion on the basis of a temperature and humidity which have been sensed through the multi-channels; a position recognizer and analyzer configured to analyze information necessary for cognizing emotion on the basis of position information which has been sensed through the multi-channels; a driver emotion condition cognizer configured to analyze information necessary for cognizing emotion on the basis of a driver's emotion conditions which have been sensed through the multi-channels; and a passenger emotion condition cognizer configured to analyze information necessary for recognizing emotion on the basis of a passenger's emotion conditions which have been sensed through the multi-channels.

The vehicle condition cognizer includes: a manifold absolute pressure sensor (MAPS) configured to sense a pressure change of a vehicle's intake manifold; a coolant sensor configured to sense an amount of a coolant in the vehicle; an illumination sensor configured to sense ambient brightness of the vehicle; an acceleration sensor configured to sense a speed of the vehicle; a throttle position sensor mounted on a side of a throttle body to sense a degree of opening of a throttle valve; and a knock sensor configured to sense an absolute combustion of the vehicle's engine.

In the embodiments, the emotion cognition processing apparatus receives the emotion information of the driver and passenger and the condition information of the vehicle over a local wireless network.

In the embodiments, the emotion-based safe driving service apparatus includes: a vehicle terminal user interface (UI) configured to provide a UI environment of the safe driving service apparatus; an emotion information management module configured to manage emotion cognition information provided thereto; an engine control unit (ECU)-linked safe driving control module configured to control ECU-linked safe driving of a vehicle in accordance with to the emotion cognition information managed by the emotion information management unit; and an emotion care safe driving service module configured to provide an emotion care safe driving service to the vehicle when the vehicle is controlled by the ECU-linked safe driving control module.

In the embodiments, the emotion information management module includes: a user emotion information manager; an EUC linker; a vehicle condition information manager; a personal terminal linkage manager; and an external network connection interface.

In the embodiments, the ECU-linked safe driving control module includes: a handle controller; an acceleration pedal controller; a break controller; a starting lock controller; an automatic vehicle speed reduction controller; and an automatic vehicle stop controller.

In the embodiments, the emotion care safe driving service module includes: a vehicle external UI platform; a guide broadcaster configured to provide emotion care-related information around a vehicle; an emotion care audio servicer configured to provide emotion care-related audio information; an emotion care video servicer configured to providing emotion care-related video information; a vehicle condition image transmitter configured to provide real-time traffic information around the vehicle as an image; a vehicle condition information message processor configured to process an operation of sending an emergency report message, a message for reporting to an emergency service center, or a message for sending notice information to an acquaintance; an illumination setter configured to set emotion care-related illumination; and a ventilation adjuster configured to adjust air ventilation associated with emotion care around the vehicle.

In the embodiments, a safe driving service method of a multi-emotion sensor node including a plurality of sensors, the safe driving service method includes: recognizing a driver and a passenger in a vehicle to objectify a sensing target; sensing emotion cognition information using the plurality of sensors, wherein the emotion cognition information includes emotion information of the driver and passenger and condition information of the vehicle; analyzing the emotion cognition information; converting the analyzed emotion cognition information into message information; and transmitting the message information corresponding to the emotion cognition information to an emotion recognition processing apparatus over a network.

In the embodiments, the sensors include one or more a heart rate sensor, a skin reaction sensor, a body temperature sensor, a voice sensor, an image sensor, and an acceleration and slope sensor.

In the embodiments, the analyzing the emotion cognition information includes: analyzing a plurality of signals sensed by the heart rate sensor to detect an HRV/pulse wave, a hematocele oxidization saturation, and intensity of a hematocele; analyzing a plurality of signals sensed by the skin reaction sensor to detect a skin conductance; analyzing a signal sensed by the body temperature sensor to detect a skin temperature; analyzing a signal sensed by the voice sensor to detect voice and a sound wave; analyzing a signal sensed by the image sensor to detect conditions of a pupil and face; and analyzing a signal sensed by the acceleration and slope sensor to detect a motion and an activity.

In the embodiments, a safe driving service method of an emotion-based safe driving service apparatus, the safe driving service method includes: classifying a sensing signal received from a multi-emotion sensor node; analyzing the classified sensing signal depending on characteristic; applying an emotion inference algorithm to a driver and a passenger in a vehicle in accordance with the analyzed result to extract emotion information of the driver and passenger; analyzing the classified sensing signal depending on characteristic of the sensor node to extract condition information of the vehicle; analyzing the emotion information of the driver and passenger and the condition information of the vehicle to provide the analyzed result for a safe driving service; and performing a selective safe driving service depending on the analyzed result.

In the embodiments, the performing the selective safe driving service includes: displaying a drowsy driving state when a current condition of the driver is in the drowsy driving state; executing an ECU-linked process for controlling safe driving in the drowsy driving state to control a reduction in a vehicle speed, an intensity of a handle, or an intensity of a pedal in accordance with a drowsy intensity; performing a drowsy emotion service to perform guide broadcasting to a drowsy state with a vehicle terminal and ventilate air in the vehicle through the control of an air conditioning system; providing a music service for awaking drowsiness, and performing guide broadcasting for inducing parking of the vehicle onto a side road; continuously monitoring a drowsy state to induce parking of the vehicle onto the side road in operational connection to a maneuver patrol when the drowsy state is continuously maintained; controlling parking of the vehicle onto the side road to stop drowsy driving by linking up with the ECU; and informing the driver being awaked from the drowsy state to a drivable state.

In the embodiments, the performing the selective safe driving service includes: displaying a driver-fatigued state when a current condition of the driver is a fatigued or health-deteriorated state; executing a safe driving service process in accordance with a health condition of the driver to perform guide broadcasting for a fatigue and health condition with a vehicle terminal and display the health condition on the vehicle terminal; determining whether the fatigue and health condition reaches an undrivable threshold; reporting to an emergency service when it is determined that the fatigue and health condition of the driver is an undrivable state; collecting position information of the vehicle; notifying an acquaintance of a health-deteriorated state; and executing an ECU-linked process for controlling safe driving in a fatigued state to control a safe speed of the vehicle and control safe driving to a destination in operational connection with a vehicle terminal navigation when it is determined that the fatigue and health condition of the driver is not the undrivable state.

In the embodiments, the performing the selective safe driving service includes: displaying a drunk driving state when a current condition of the driver is a drunk driving state; executing a drunk driving prevention service process to display an alcohol concentration with a vehicle terminal; providing guide broadcasting for warning against drunk driving with the vehicle terminal; determining whether the vehicle is currently stopped; executing an ECU-linked process to control parking of the vehicle onto a side road and control a starting lock such that the driver cannot drive the vehicle in the drunk state any longer, when it is determined that the vehicle is continuously driven; collecting position information of the vehicle; and notifying a maneuver patrol of the collected position information.

In the embodiments, the performing the selective safe driving service includes: displaying a reckless driving state of the driver; executing a reckless driving prevention service process to provide guide broadcasting for warning against reckless driving with the vehicle terminal, when a current condition of the driver is an angry state; checking whether the driver is continuously performing reckless driving; executing an ECU-linked process to control an intensity of a handle and control an intensity of an acceleration pedal, when it is checked that the driver is continuously performing the reckless driving; reproducing an emotion care music; notifying a maneuver patrol of information on a reckless-driving vehicle in automatic connection with the maneuver patrol; and collecting position information of the vehicle to notify the maneuver patrol of the collected position information.

In the embodiments, the performing the selective safe driving service includes: displaying a feared state in the vehicle; executing a rescue service process for rescuing the driver from the feared state to provide a service which protects the driver from fear, when it is determined that the driver or the passenger has a sensation of fear; collecting real-time image or voice data on situations inside the vehicle; automatically reporting to a maneuver center, maneuver center, or maneuver patrol center a maneuver patrol; sending the collected data to the maneuver center, maneuver center, or maneuver patrol center in real time; collecting position information of the vehicle; sending the collected position information to the maneuver center, maneuver center, or maneuver patrol center in real time; analyzing, by 112 maneuver center, 119 maneuver center or maneuver patrol center, the situations and position information to determine whether it is required to control a track and stop of the vehicle; reiteratively performing the operations until the feared state is removed, when it is determined that controlling the stop of the vehicle is not required; and executing an ECU-linked process to control the stop of the vehicle and control a starting lock until the maneuver center, maneuver center, or the maneuver patrol arrives, when it is determined that controlling the stop of the vehicle is required.

In the embodiments, the performing the selective safe driving service includes: displaying a state of talking over a phone while driving; executing a process for a call prevention service while driving to broadcast guidance for stopping to talk over the phone while driving with the vehicle terminal and induce a handsfree call, when the driver is talking over the phone while driving; checking whether the driver voluntarily performs the handsfree call; guiding provision of an automatic wireless handsfree calling with a vehicle terminal; checking whether to allow provision of the automatic wireless handsfree calling, when it is determined that the driver does not voluntarily perform the handsfree call; performing the automatic wireless handsfree calling to provide a handsfree call service, when it is determined that the provision is allowed; executing an ECU-linked process to control an intensity of a handle, control a reduction in an acceleration pedal, and control stop of the vehicle onto a side road for building a traffic flow and a safe driving environment, when it is determined that the provision is not allowed; executing a call abandonment induction service process to perform a call quality down function to induce stop of a call; checking whether the driver abandons talking over a phone while driving; and continuously performing the call quality down function until a call is ended when it is checked that the driver does not abandon talking over the phone while driving.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
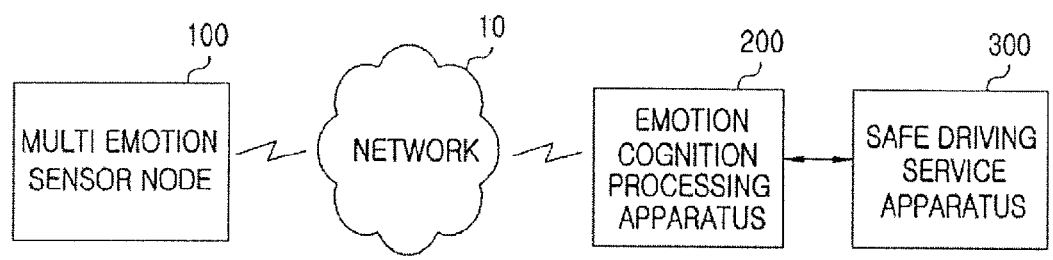
FIG. 1 is a schematic block diagram of a safe driving service system for vehicle based on emotion cognition in accordance with an embodiment of the present invention.

FIG. 1 is a schematic block diagram of a safe driving service system for vehicle based on emotion recognition in accordance with an embodiment of the present invention.

Referring to FIG. 1, the safe driving service system includes a multi-emotion sensor node 100, a network 10, an emotion recognition processing apparatus 200, and a safe driving service apparatus 300.

The multi-emotion sensor node 100 includes a plurality of sensor nodes that sense emotion information of a driver and passenger and condition information of a vehicle. The multi-emotion sensor node 100 transfers the sensing information to the emotion cognition processing apparatus 200 over a network 10.

The network 10 provides the transmission of the sensing information sensed by the multi-emotion sensor node 100 to the emotion recognition processing apparatus 200. The network, for example, may include a local area network (LAN). For example, the local area network may employ a local wireless network such as Bluetooth, near field communication (NFC), radio frequency identification (RFID), and ZigBee.

The emotion cognition processing apparatus 200 cognizes the user's emotion information and the vehicle's condition information from the sensing information that is provided by the multi-emotion sensor node 100, and transfers the cognized emotion information and condition information to the safe driving service apparatus 300.

The safe driving service apparatus 300 provides a safe driving service on the basis of the cognized emotion information that is provided from the emotion recognition processing apparatus 200.

Figure 2:
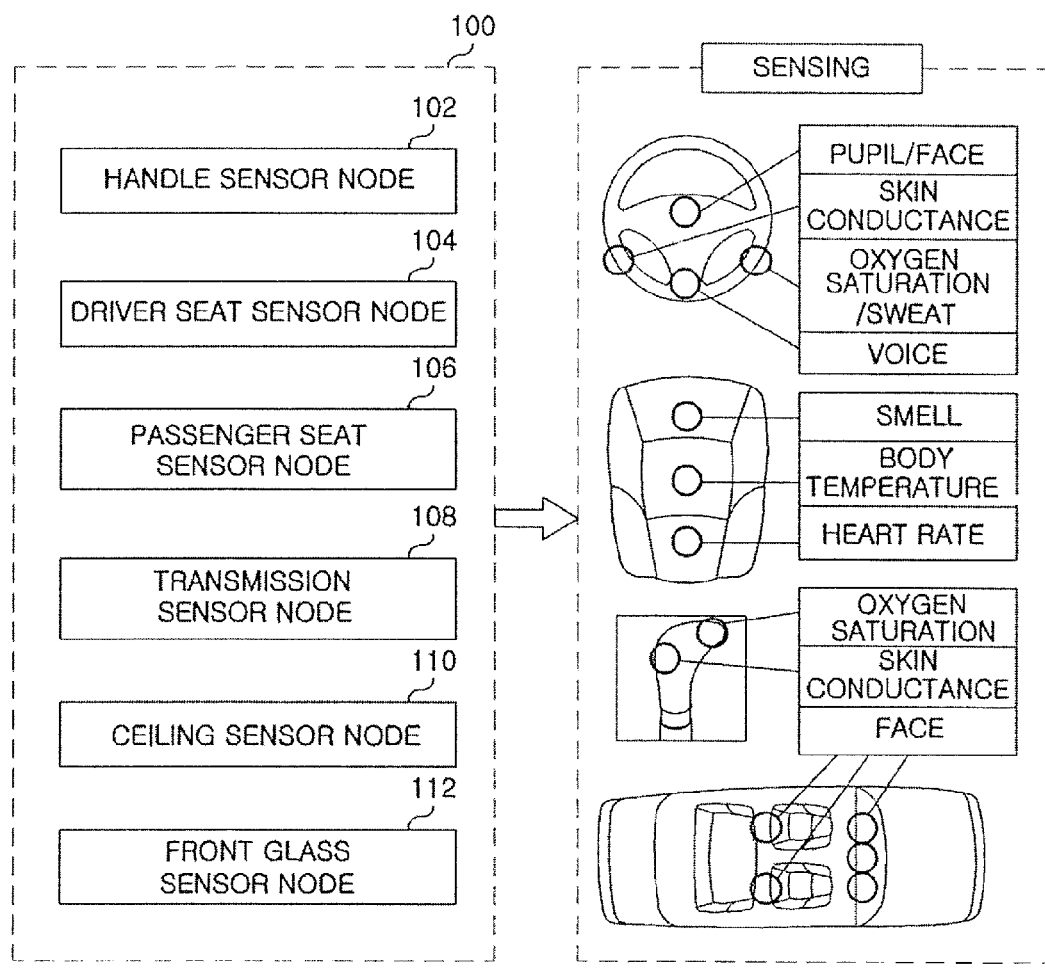
FIG. 2 is a conceptual diagram of a multi-emotion sensor node group for vehicle for providing a safe driving service, shown in FIG. 1, in accordance with an embodiment of the present invention.

FIG. 2 is a conceptual diagram for describing the multi-emotion sensor node group 100 for vehicle in accordance with an embodiment of the present invention in more detail.

Referring to FIG. 2, the multi-emotion sensor node 100 for vehicle is constituted with a handle sensor node 102, a driver seat sensor node 104, a passenger seat sensor node 106, a transmission sensor node 108, a ceiling sensor node 110, and a front glass sensor node 112. The multi-emotion sensor nodes 102 to 112 are mounted into a vehicle. The multi-emotion sensor nodes 102 to 112 sense various sensing information (i.e., bio and environment information necessary for cognizing the emotion of the user and the condition information of the vehicle), and transmits the sensing information to the emotion recognition processing apparatus 200 over the network 10.

The sensing information, as illustrated in FIG. 2, may include information about a pupil, face, skin conductance, oxygen saturation, voice, smell, body temperature, heart rate, etc which are sensed by their respective sensors. For example, the handle sensor node 102 may include a plurality of sensors configured to sense the information about the pupil, face, skin conductance, oxygen saturation, and voice.

In an embodiment, the driver seat sensor node 104 is exemplified to include a smell sensor, a body temperature sensor, a heat rate sensor and the like. This is merely an exemplification for describing the embodiment, and it can be understood to those skilled in the art that the driver seat sensor node 104 may further include various sensors as well as the sensors described herein, as necessary.

Figure 3:
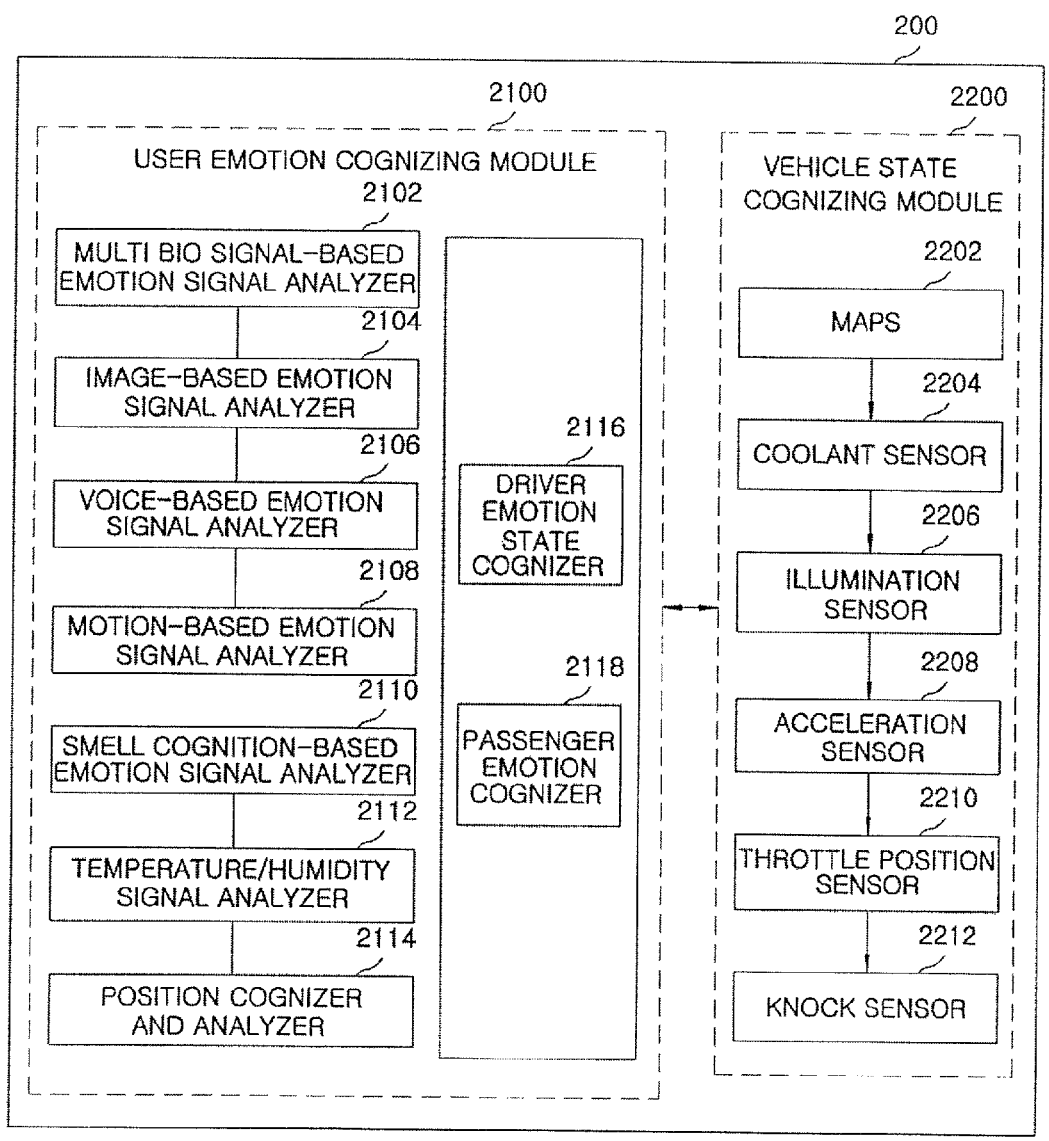
FIG. 3 is a detailed block diagram of an emotion recognition processing apparatus for providing a safe driving service shown in FIG. 1 in accordance with an embodiment of the present invention.

FIG. 3 is a detailed block diagram of an emotion cognition processing apparatus shown in FIG. 1 in accordance with an embodiment of the present invention.

The emotion cognition processing apparatus 200 combines the user's emotion information and the vehicle's condition information from the sensing information that is provided by the multi-emotion sensor node 100. Further, the emotion cognition processing apparatus 200 analyzes the combined user's emotion and vehicle's condition information in order to cognize the emotion information of the user and provide a safe driving service to the user, thereby generating emotion cognition information. As shown in FIG. 3, the emotion cognition processing apparatus 200 for vehicle includes a user emotion cognizing module 2100 and a vehicle condition cognizing module 2200.

The user emotion cognition module 2100 includes: a multi-bio signal-based emotion analyzer 2102 that analyzes information necessary for cognizing emotion on the basis of bio signals which have been sensed through multi-channels; an image signal-based emotion analyzer 2104 that analyzes information necessary for cognizing emotion on the basis of image signals which have been sensed through the multi-channels; a voice signal-based emotion analyzer 2106 that analyzes information necessary for cognizing emotion on the basis of voice signals which have been sensed through the multi-channels; a motion-based emotion analyzer 2108 that analyzes information necessary for cognizing emotion on the basis of motion signals which have been sensed through the multi-channels; a smell-based emotion analyzer 2110 that analyzes information necessary for cognizing emotion on the basis of smell signal which has been sensed through the multi-channels; a temperature/humidity analyzer 2112 that analyzes information necessary for cognizing emotion on the basis of temperatures and humidity which have been sensed through the multi-channels; a position recognizer and analyzer 2114 that analyzes information necessary for cognizing emotion on the basis of position signal which has been sensed through the multi-channels; a driver emotion cognizer 2116 that analyzes information necessary for cognizing emotion on the basis of a driver's emotion conditions which have been sensed through the multi-channels; and a passenger emotion recognizer 2118 that analyzes information necessary for recognizing emotion on the basis of a passenger's emotion conditions which have been sensed through the multi-channels.

The vehicle condition cognizing module 2200 includes a manifold absolute pressure sensor (MAPS) 2202 that senses the pressure change of a vehicle's intake manifold, a coolant sensor 2204 that senses the amount of a coolant in the vehicle, an illumination sensor 2206 that senses the ambient brightness of the vehicle, an acceleration sensor 2208 that senses the speed of the vehicle, a throttle position sensor 2210 that is mounted on the side of a throttle body and senses the degree of opening of a throttle valve, and a knock sensor 2212 that senses the abnormal combustion of the vehicle's engine.

Figure 4:
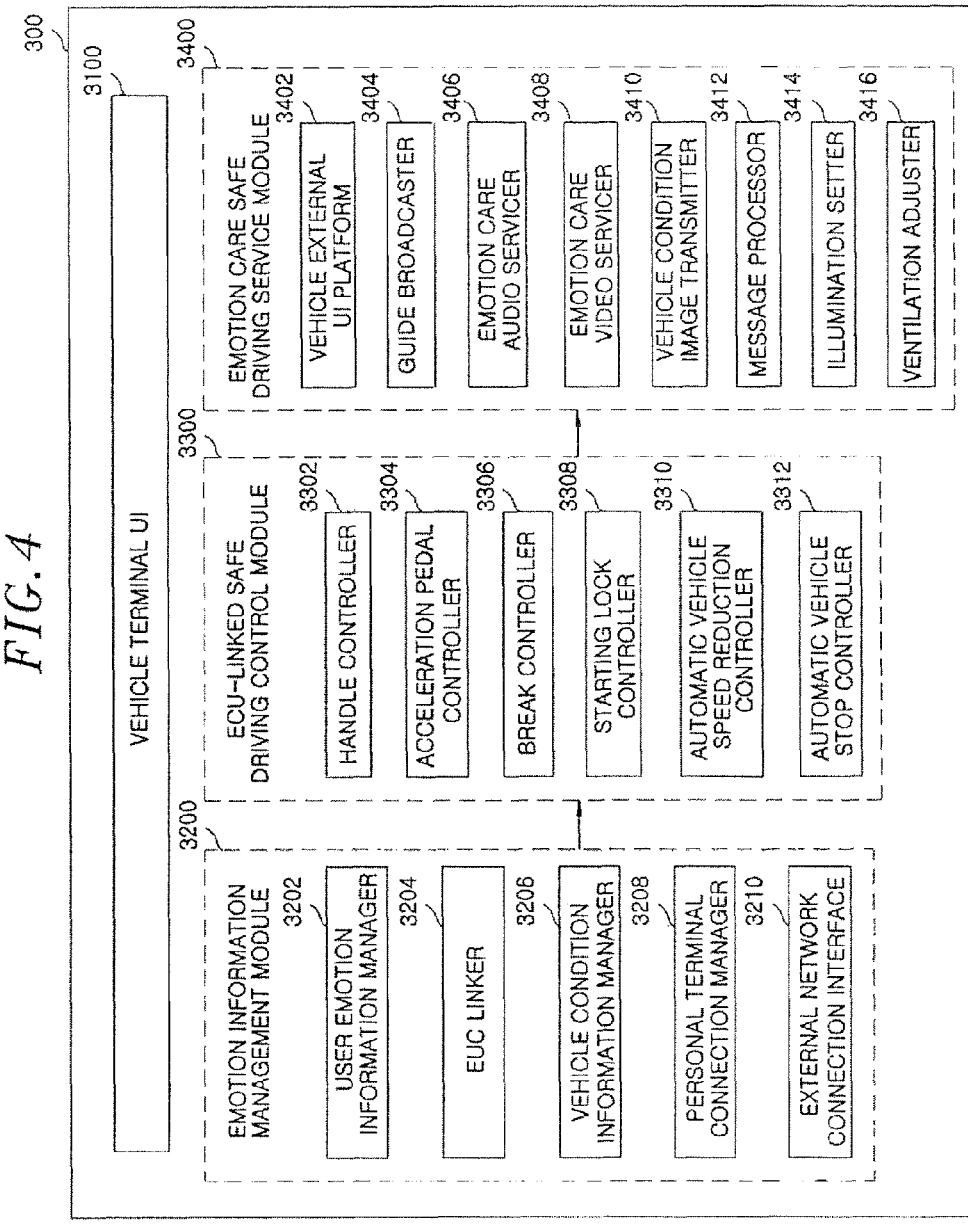
FIG. 4 is a detailed block diagram of a safe driving service apparatus shown in FIG. 1 in accordance with an embodiment of the present invention.

FIG. 4 is a detailed block diagram of the safe driving service apparatus 300 in accordance with an embodiment of the present invention.

The safe driving service apparatus 300 provides a safe driving service on the basis of the emotion recognition information which is provided from the emotion recognition processing apparatus 200. As illustrated in FIG. 4, the safe driving service apparatus 300 includes: a vehicle terminal user interface (UI) 3100 that provides a UI environment of the safe driving service apparatus 300; an emotion information management module 3200 that manages the emotion cognition information provided from the emotion cognition processing apparatus 200 and is operationally connected to an external device; an engine control unit (ECU)-linked safe driving control module 3300 that controls the ECU-linked safe driving of a vehicle in accordance with the emotion cognition information managed by the emotion information management module 3200; and an emotion care safe driving service module 3400 that provides a safe driving service by caring for emotion in accordance with the emotion cognition information managed by the emotion information management module 3200.

Here, the emotion information management module 3200 includes a user emotion information manager 3202, an EUC linker 3204, a vehicle condition manager 3206, a personal terminal linkage manager 3208, and an external network connection interface 3210.

Moreover, the ECU-linked safe driving control module 3300 includes a handle controller 3302, an acceleration pedal controller 3304, a break controller 3306, a starting lock controller 3308, an automatic vehicle speed reduction controller 3310, and an automatic vehicle stop controller 3312.

Furthermore, the emotion care safe driving service module 3400 includes: a vehicle external UI platform 3402; a guide broadcaster 3404 that provides the emotion condition of a driver and passenger and a guidance for safe driving; an emotion care audio servicer 3406 that provides emotion care-related audio information; an emotion care video servicer 3408 that provides emotion care-related video information; a vehicle condition image transmitter 3410 that provides a vehicle condition as an image in real time; a vehicle condition information message processor 3412 that process an operation of sending an emergency action report message, for example, a message for reporting to a maneuver patrol, 112, 911 or the like or a message for sending notice information to an acquaintance; an illumination setter 3414 that sets emotion care-related illumination; and a ventilation adjuster 3416 that adjusts an air adjuster, an air conditioner, opening/closing of windows and the like for air ventilation associated with emotion care.

Figure 5:
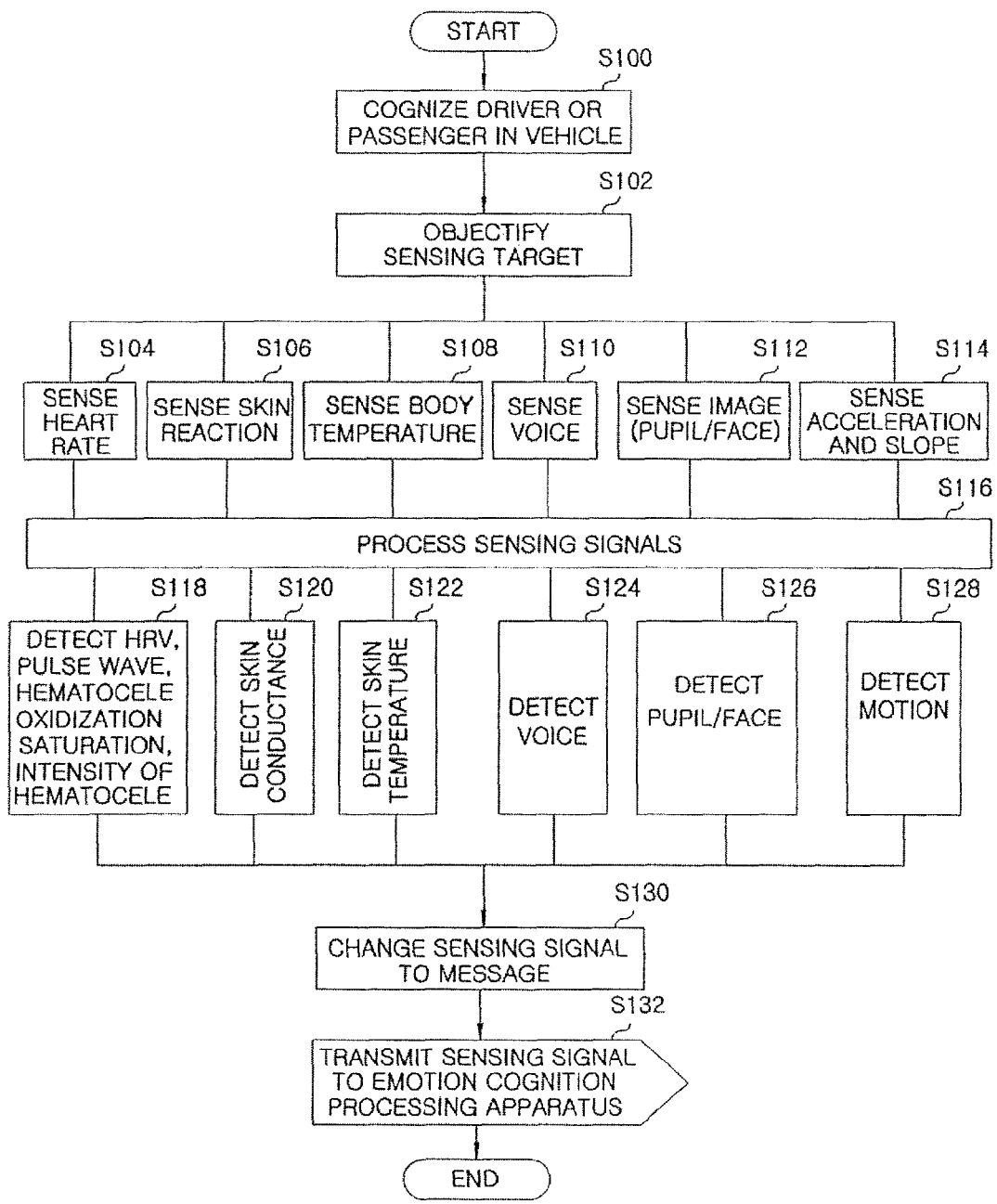
FIG. 5 is a flowchart illustrating a method for an emotion-based safe driving service performed by a multi-emotion sensor node in accordance with an embodiment of the present invention.

FIG. 5 is a flowchart illustrating a method for an emotion-based safe driving service performed by a multi-emotion sensor node 100 shown in FIG. 1 in accordance with an embodiment of the present invention.

As illustrated in FIG. 5, the multi-emotion sensor node 100 recognizes a driver and a passenger in operation S100, objectifies a sensing target of the driver and passenger in operation S102, and senses the emotion condition of the driver and passenger and the condition of a vehicle by using the plurality of sensors.

In the embodiment of FIG. 5, the plurality of sensors may include a heart rate sensor, a skin reaction sensor, a body temperature sensor, a voice sensor, an image sensor, and an acceleration and slope sensor. Specifically, a variety of the sensors in the multi-emotion sensor node senses or detects a heart rate, a skin reaction, a body temperature, voice, an image of a pupil/face, and an acceleration speed/slope in operations S104, S106, S108, S110, S112, and S114, respectively.

Subsequently, the multi-emotion sensor node 100 processes the sensing signals to be adapted for the emotion cognition processing apparatus 200 in operation S116. Here, for example, the signal processing may include an analog-digital convertsion, an amplification, a filtering of the sensing signals.

Specifically, in operation S118, a plurality of signals sensed by the heart rate sensor is analyzed to detect an HRV/pulse wave, a hematocele oxidization saturation, and the intensity of a hematocele; in operation S120, a plurality of signals sensed by the skin reaction sensor is analyzed to detect a skin conductance; in operation S122, a signal sensed by the body temperature sensor is analyzed to detect a skin temperature; in operation S124, a signal sensed by the voice sensor is analyzed to detect voice and a sound wave; in operation S126, a signal sensed by the image sensor is analyzed to detect the conditions of a pupil and face; in operation S128, a signal sensed by the acceleration and slope sensor is analyzed to detect a motion and an activity.

Thereafter, the multi-emotion sensor node 100 converts the detected sensing signals into message information in operation S130, and sends the message information to the emotion cognition processing apparatus 200 over the network 10 in operation S132.

Figure 6:
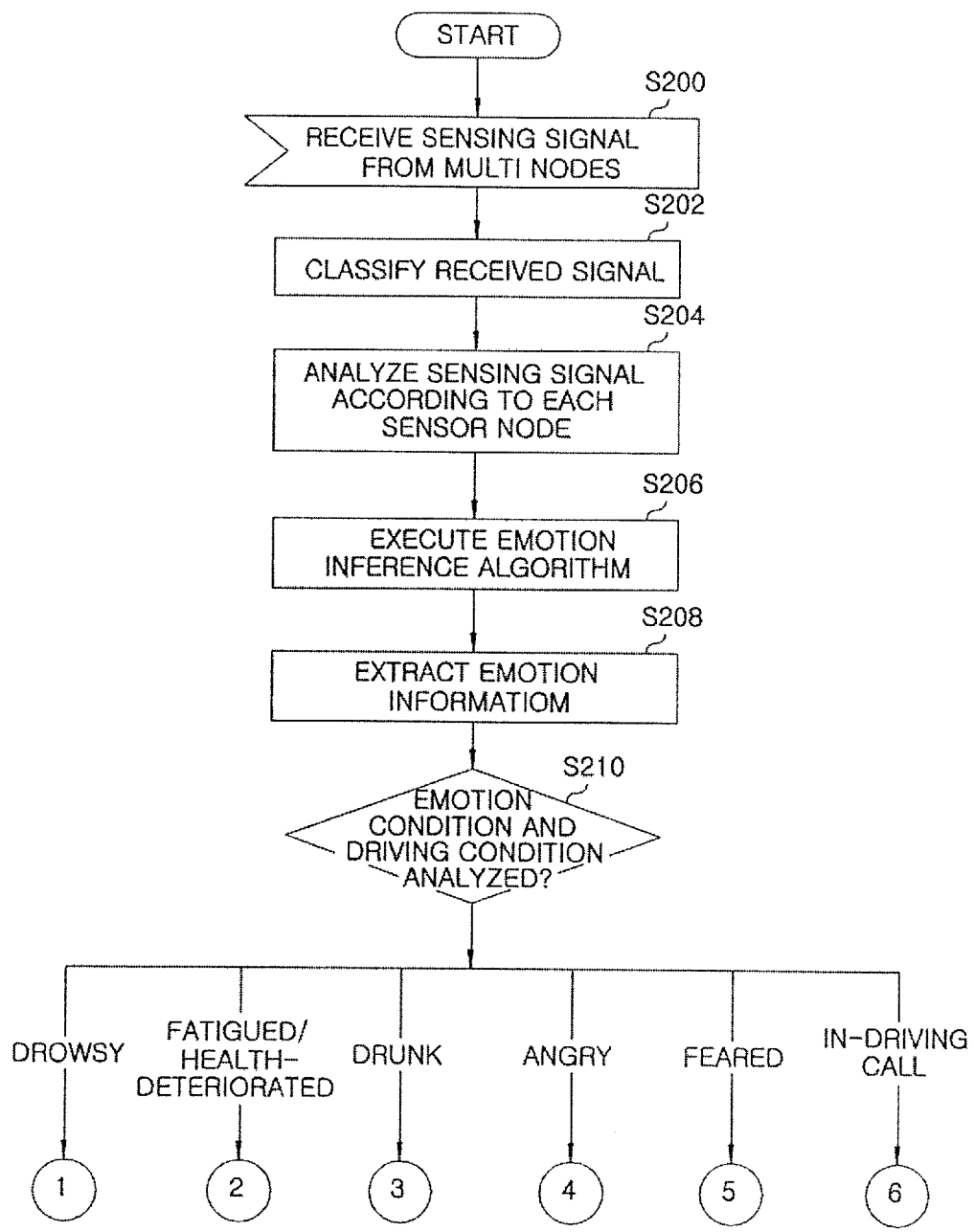
FIG. 6 is a flowchart illustrating a method performed by an emotion recognition processing apparatus in accordance with an embodiment of the present invention.

FIG. 6 is a flowchart illustrating an emotion-based safe driving service method for vehicle which is performed by the emotion cognition processing apparatus 200 in accordance with an embodiment of the present invention.

As illustrated in FIG. 6, when the sensing signals are received from the multi-emotion sensor node 100 in operation S200, the emotion cognition processing apparatus 200 classifies the received sensing signals in operation S202.

Subsequently, the emotion cognition processing apparatus 200 analyzes the classified sensing signals in accordance with the characteristic of each of the sensor nodes in operation S204 and an emotion inference algorithm is applied to the driver and the passenger in accordance with the analyzed result in operation S206. Emotion information of the driver and passenger (for example, the physiological emotion information and psychological emotion information of the driver and passenger) is extracted to cognize an emotion condition in operation S208.

Moreover, the emotion cognition processing apparatus 200 analyzes the classified sensing information in accordance with the characteristics of the sensor nodes to extract the condition information of the vehicle in operation S210.

In an embodiment of the present invention, the condition information of the vehicle and the emotion information of the driver and passenger may be cognized. The emotion cognition processing apparatus 200 analyzes the emotion cognition information, and provides the analyzed result to the safe driving service apparatus 300.

The safe driving service apparatus 300 selectively performs a safe driving service on the basis of the analysis result of the emotion cognition information. For example, the safe driving service apparatus 300 divides the condition of the driver into a drowsy driving state, a fatigued/health-deteriorated state, a drunk driving state, an angry state, a feared state, or an in-driving call state in accordance with the analysis result of the emotion recognition information to perform a safe driving service suitable for the respective states as indicated by tabs 1, 2, 3, 4, 5, and 6.

FIGS. 7 to 12 are flowcharts exemplarily illustrating a plurality of safe driving service operations which are selectively performed by the safe driving service apparatus 300 in accordance with the analysis result of the emotion recognition information.

Figure 7:
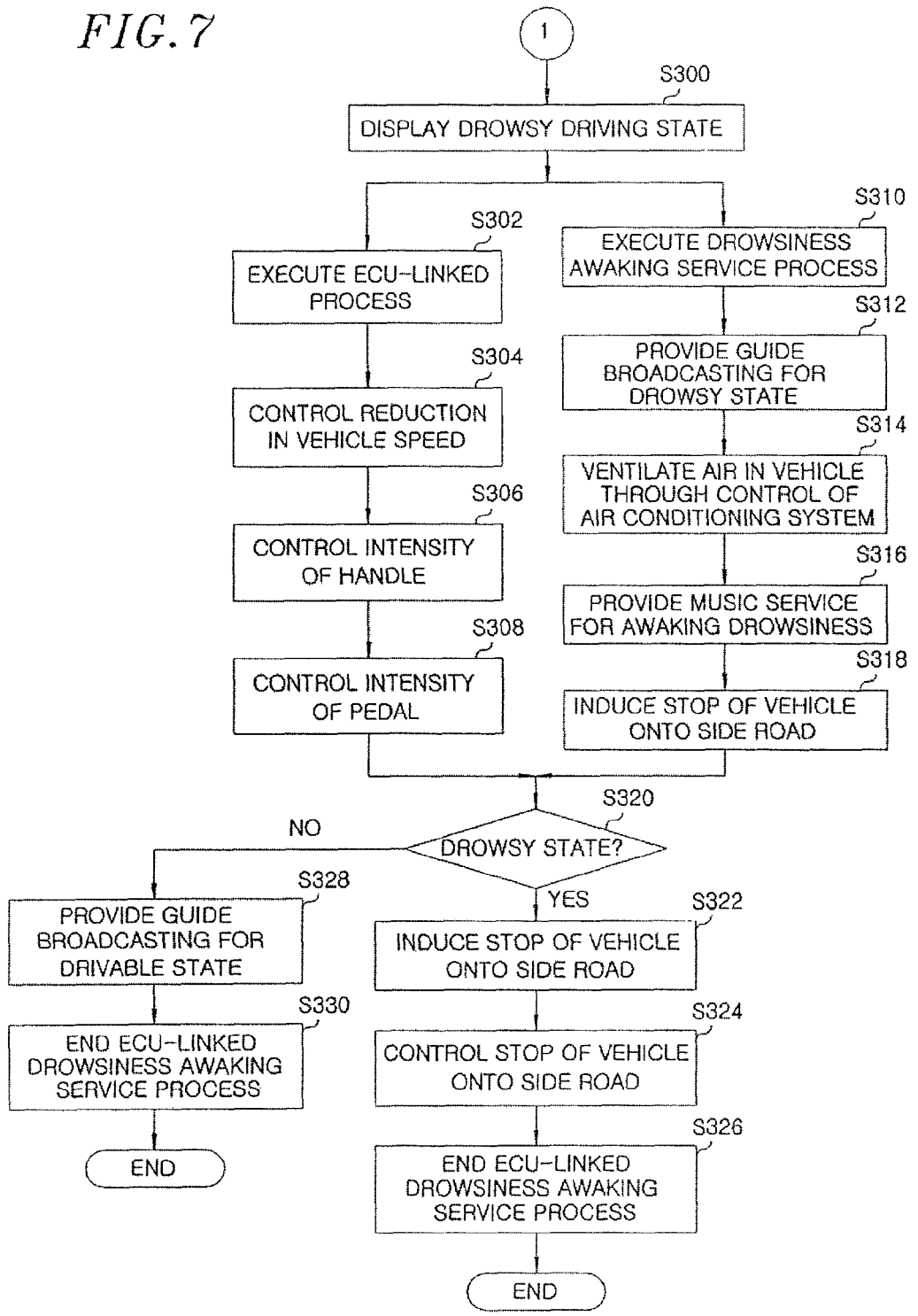
FIGS. 7 to 12 are flowcharts exemplarily illustrating detailed service operations of an emotion-based safe driving service method which is performed by a safe driving service apparatus in accordance with an emotion condition and a driving condition on emotion cognition information of FIG. 6.

First, FIG. 7 illustrates a safe driving service operation when the current condition of the driver is the drowsy driving state.

When the driver is in the drowsy driving state, the safe driving service apparatus 300 displays the drowsy driving state on the vehicle, for example, windows or a front- or rear-headlamp in operation S300, and executes an ECU-linked process for controlling safe driving in the drowsy driving state in operation S302, thereby controlling the reduction in a vehicle speed, the intensity of a handle, and the intensity of a pedal in accordance with a drowsy intensity in operations S304, S306 and S308, respectively.

Simultaneously, the safe driving service apparatus 300 may perform a process for a drowsy awakening service in operation S310, perform guide broadcasting to awake a drowsy state with a vehicle terminal in operation S312, and ventilate air in the vehicle through the control of an air conditioning system in operation S314. Also, the safe driving service apparatus 300 may provide a music service for awaking the drowsiness of the driver in operation S316, and perform guide broadcasting for inducing the parking of the vehicle onto a side road in operation S318.

Thereafter, the safe driving service apparatus 300 may continuously monitor the drowsy state in operation S320. When it is determined that the drowsy state is continued, the safe driving service apparatus 300 may induce the parking of the vehicle onto the side road in operational connection with a maneuver patrol in operation S322, control the parking of the vehicle onto the side road to stop drowsy driving by linking up with an ECU in operation S324, and end a drowsiness awaking service process in operation S330.

Meanwhile, when the driver has been awaked from the drowsy state, the safe driving service apparatus 300 informs that the driver has been awaked from the drowsy state to a drivable state in operation S328, and ends the ECU-linked drowsiness awaking service process in operation S330.

Figure 8:
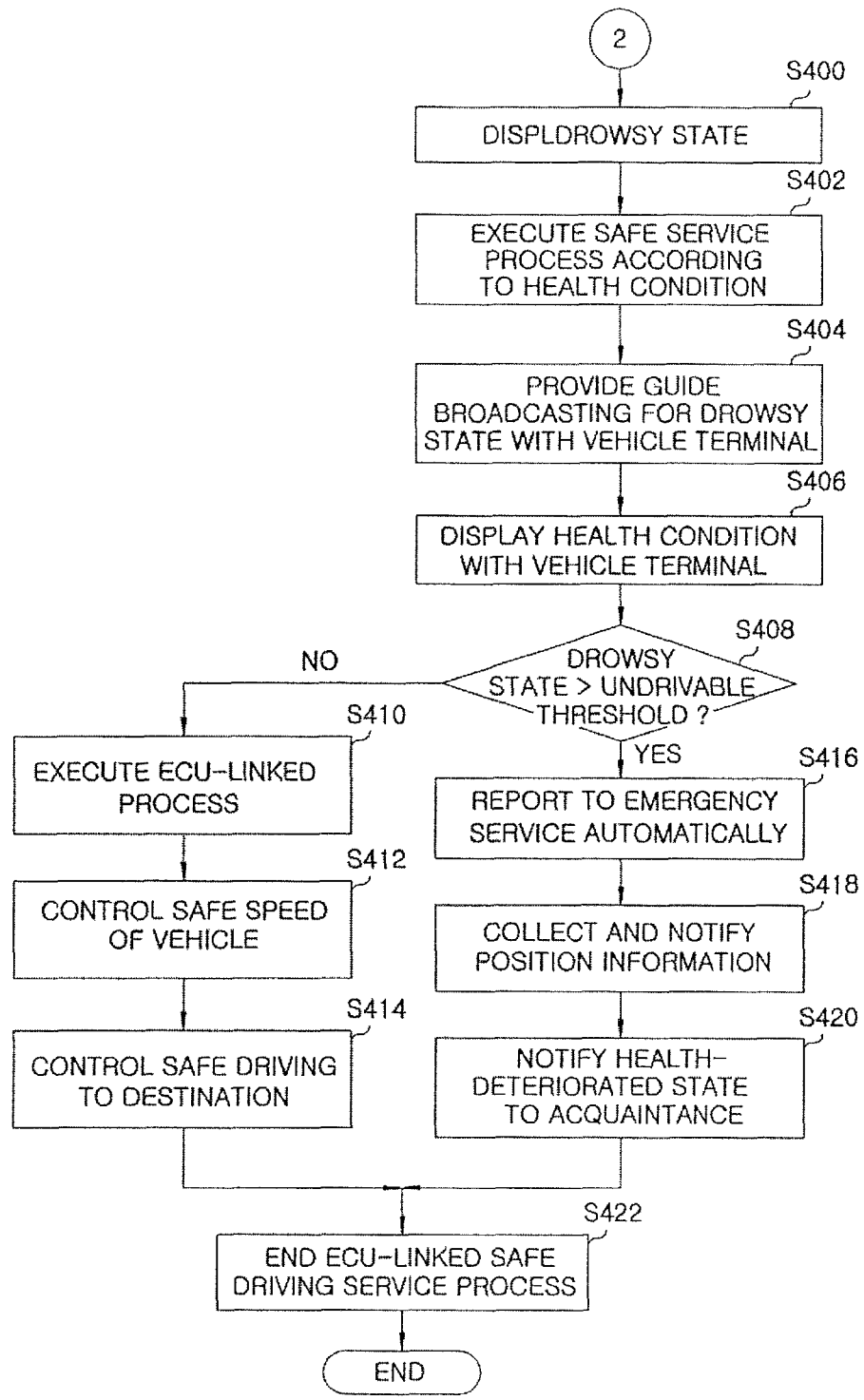

FIG. 8 illustrates a safe driving service operation when the current condition of the driver is the fatigued/health-deteriorated state.

When the current condition of the driver is the fatigued/health-deteriorated state, the safe driving service apparatus 300 displays a driver-fatigued state on the vehicle in operation S400, and executes the safe driving service process in accordance with the health condition of the driver in operation S402, thereby performing guide broadcasting for a fatigue and health condition with the vehicle terminal in operation S404 and displaying the health condition on the vehicle terminal in operation S406.

Thereafter, the safe driving service apparatus 300 determines whether the fatigue and health condition reaches an undrivable threshold in operation S408.

When it is determined in operation S408 that the fatigue and health condition of the driver is an undrivable state, the safe driving service apparatus 300 reports to an emergency service, for example, 911 service or the like in operation S416. The safe driving service apparatus 300 collects the position information of the vehicle and notifies 119 and a maneuver patrol of the collected position information in operation S418. Also, the safe driving service apparatus 300 an acquaintance of a health-deteriorated state notifies in operation S420, enables the driver's family to respond to the deteriorated health of the driver, and ends the ECU-linked safe driving service process for a health condition in operation S422.

On the other hand, when it is determined in operation S408 that the fatigue and health condition of the driver is not an undrivable state, the safe driving service apparatus 300 executes an ECU-linked process for controlling safe driving in a fatigued state in operation S410, controls the safe speed of the vehicle in operation S412, controls safe driving to a destination in operational connection with a vehicle terminal navigation in operation S414, and ends the ECU-linked and the safe driving service process for a health condition in operation S422.

Figure 9:
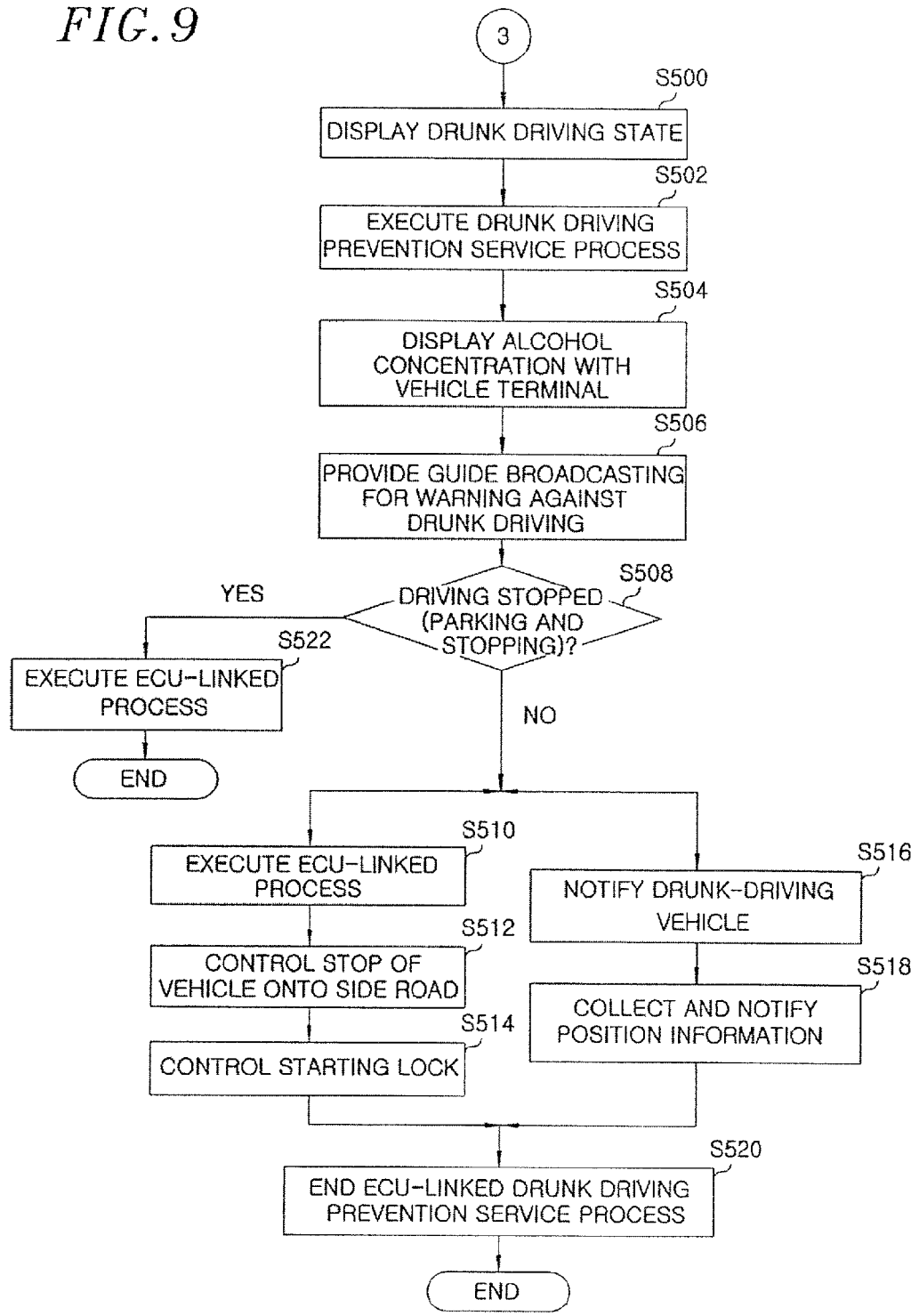

FIG. 9 illustrates a safe driving service operation when the current condition of the driver is the drunk driving state.

When the current condition of the driver is the drunk driving state, the safe driving service apparatus 300 displays the drunk driving state on the vehicle in operation S500, and executes a drunk driving prevention service process in operation S502, thereby displaying an alcohol concentration with the vehicle terminal in operation S504 and providing guide broadcasting for warning against drunk driving with the vehicle terminal in operation S506.

Thereafter, the safe driving service apparatus 300 determines whether the driver stops drunk driving, namely, the vehicle is currently stopped in operation S508.

When it is determined in operation S508 that the vehicle is currently stopped, the safe driving service apparatus 300 ends the drunk driving prevention service process in operation S522.

On the other hand, when it is determined in operation S508 that the driver is continuously driving the vehicle in a drunk state, the safe driving service apparatus 300 executes the ECU-linked process in operation S510, controls the parking of the vehicle onto a side road in operation S512, and controls a starting lock such that the driver cannot drive the vehicle in the drunk state any longer in operation S514.

Simultaneously, the safe driving service apparatus 300 is automatically connected to the maneuver patrol and notifies the maneuver patrol of information on a drunk-driving vehicle in operation S516, and collects the position information of the vehicle to notify the maneuver patrol of the collected position information in operation S518.

Thereafter, the safe driving service apparatus 300 ends the ECU-linked process for the drunk driving prevention service in operation S520.

Figure 10:
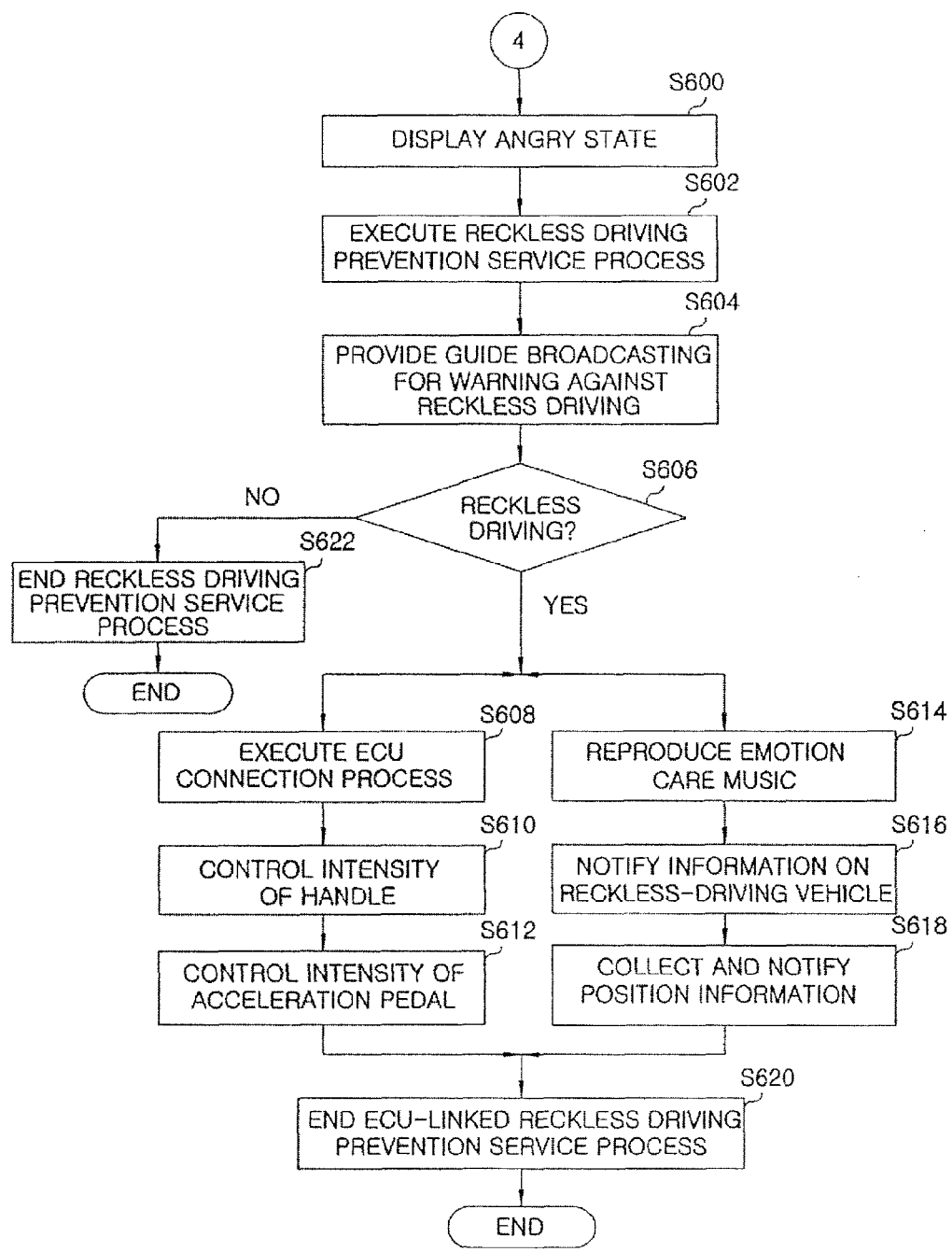

FIG. 10 illustrates a safe driving service operation when the current condition of the driver is the angry state.

The safe driving service apparatus 300 analyzes the current emotion cognition information of the driver. When the current condition of the driver is the angry state, the safe driving service apparatus 300 displays the reckless driving state of the driver on the vehicle in operation S600, and executes a reckless driving prevention service process in operation S602, thereby providing guide broadcasting for warning against reckless driving with the vehicle terminal in operation S604.

Thereafter, the safe driving service apparatus 300 checks whether the driver is continuously performing reckless driving in operation S606.

When it is checked in operation S606 that the driver stops the reckless driving and stops or parks the vehicle, the safe driving service apparatus 300 ends the reckless driving prevention service process in operation S622.

On the other hand, when it is checked in operation S606 that the driver is continuously performing the reckless driving, the safe driving service apparatus 300 executes the ECU-linked process in operation S608, controls the intensity of the handle in operation S610, and controls the intensity of the acceleration pedal in operation S612.

Simultaneously, the safe driving service apparatus 300 reproduces music for emotion care in operation S614. The safe driving service apparatus 300 is automatically connected to the maneuver patrol and notifies the maneuver patrol of information on a reckless-driving vehicle in operation S616, and collects the position information of the vehicle to notify the maneuver patrol of the collected position information in operation S618.

Thereafter, the safe driving service apparatus 300 ends the ECU-linked process for reckless driving prevention service in operation S620.

Figure 11:
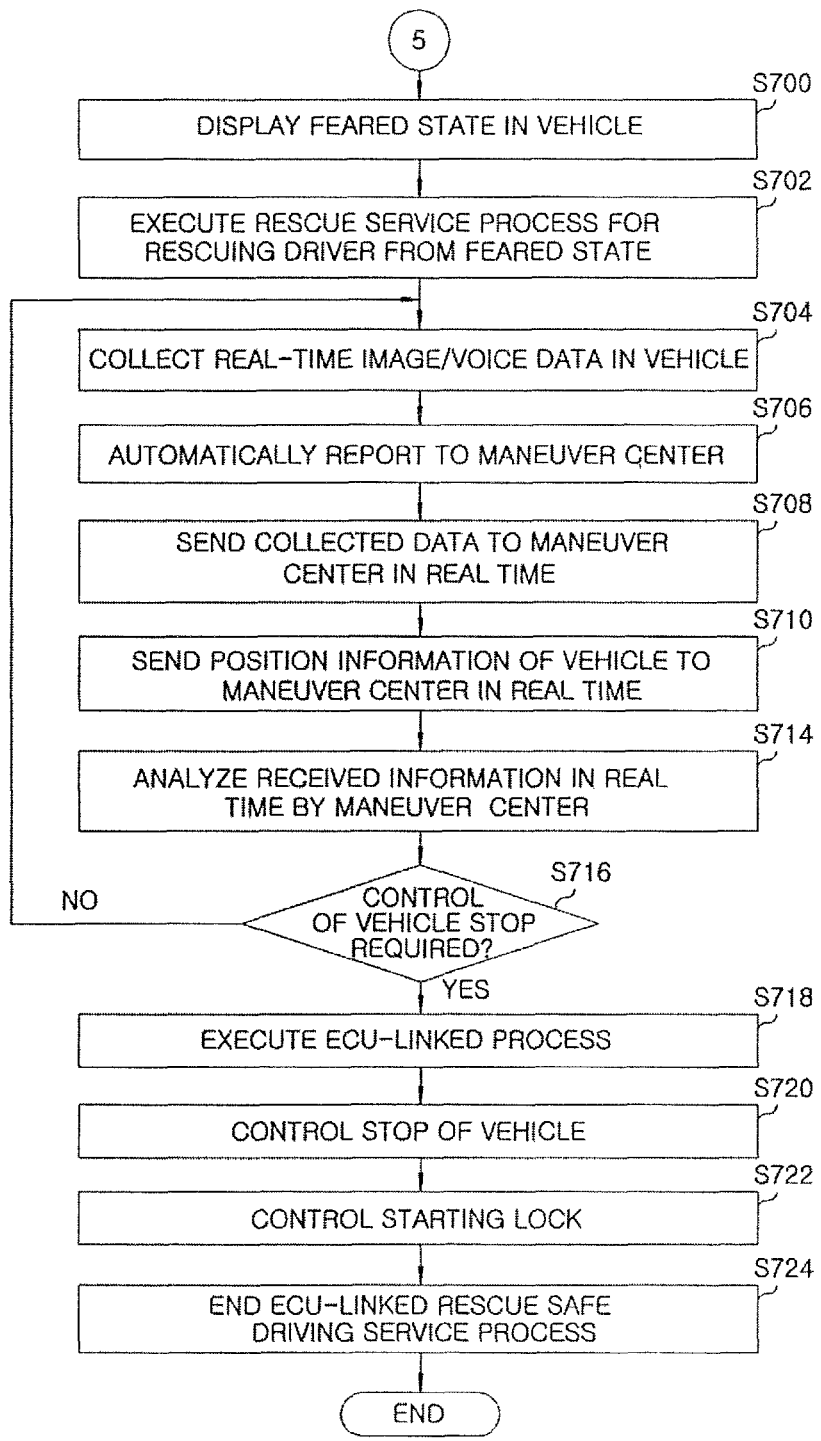

FIG. 11 illustrates a safe driving service operation when the driver or the passenger has a sensation of fear.

When it is determined that the driver or the passenger has a sensation of fear, the safe driving service apparatus 300 displays a feared state in the vehicle on the vehicle in operation S700, and executes a rescue service process for rescuing the driver from the feared state in operation S702, thereby providing a service that protects the driver from fear.

Subsequently, the safe driving service apparatus 300 collects real-time image/voice data on situations inside the vehicle in operation S704, automatically reports to the 112, 911 or maneuver patrol in operation S706, and sends the collected data to a 112 maneuver center, a 911 maneuver center or a maneuver patrol center in real time in operation S708.

Simultaneously, the safe driving service apparatus 300 collects the position information of the vehicle in operation S710, and sends the collected position information to the 112 maneuver center, the 911 maneuver center or the maneuver patrol center in real time in operation S712.

The 112 maneuver center, the 911 maneuver center or the maneuver patrol center analyzes the information that has been collected through operations S704 to S712, and determines whether it is required to control the track and stop of the vehicle in operation S716.

When it is determined in operation S716 that controlling the stop of the vehicle is not required, the safe driving service apparatus 300 reiteratively performs operations S704 to S714 until the feared state is removed.

However, when it is determined in operation S716 that controlling the stop of the vehicle is required, the safe driving service apparatus 300 executes the ECU-linked process in operation S718, controls the stop of the vehicle in operation S720, and controls the starting lock until the 112 patrol, the 911 patrol, or the maneuver patrol arrives in operation S722.

Thereafter, the safe driving service apparatus 300 ends the ECU-linked rescue service process for rescuing the driver from the feared state in operation S724.

Figure 12A:
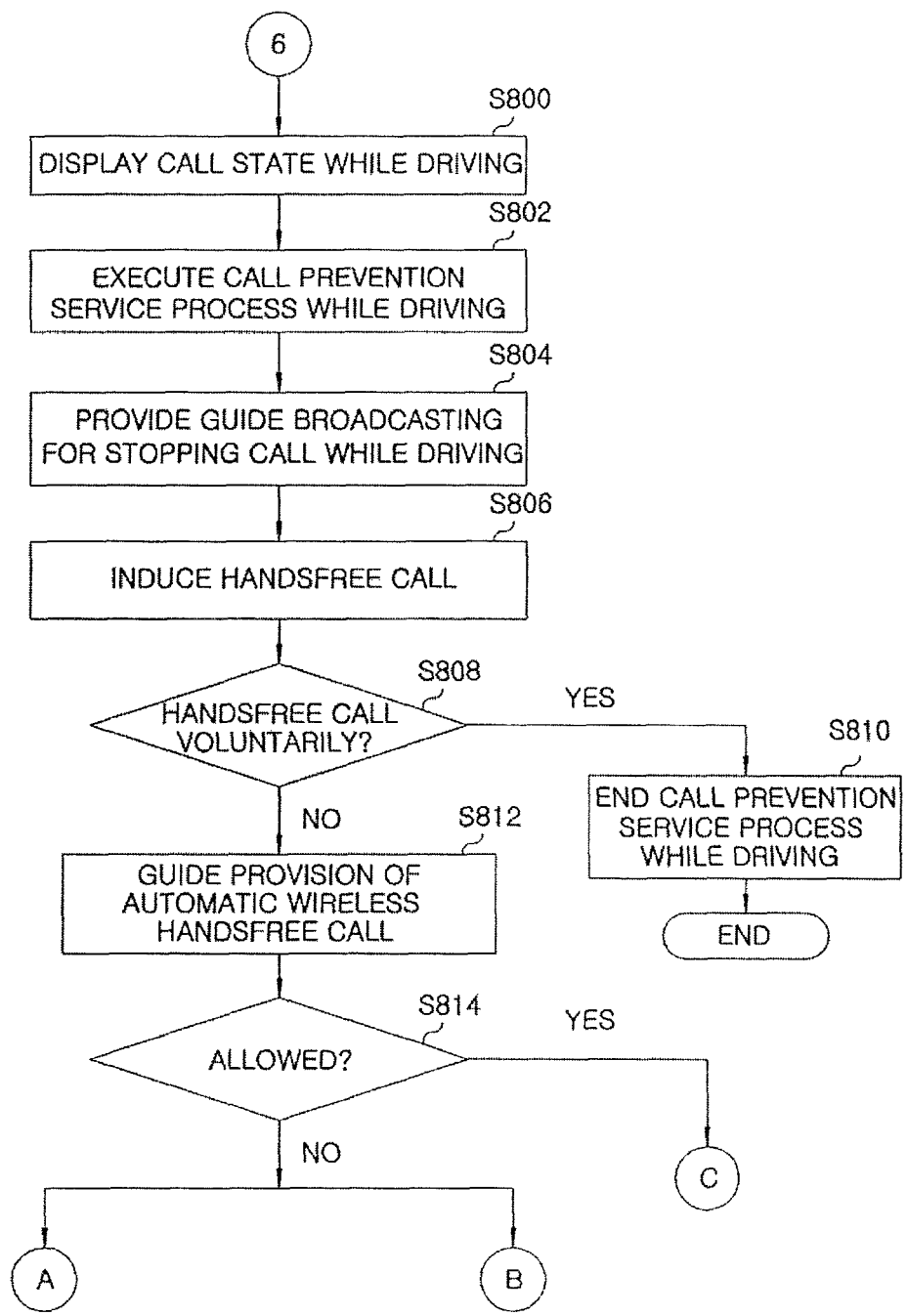
Figure 12B:
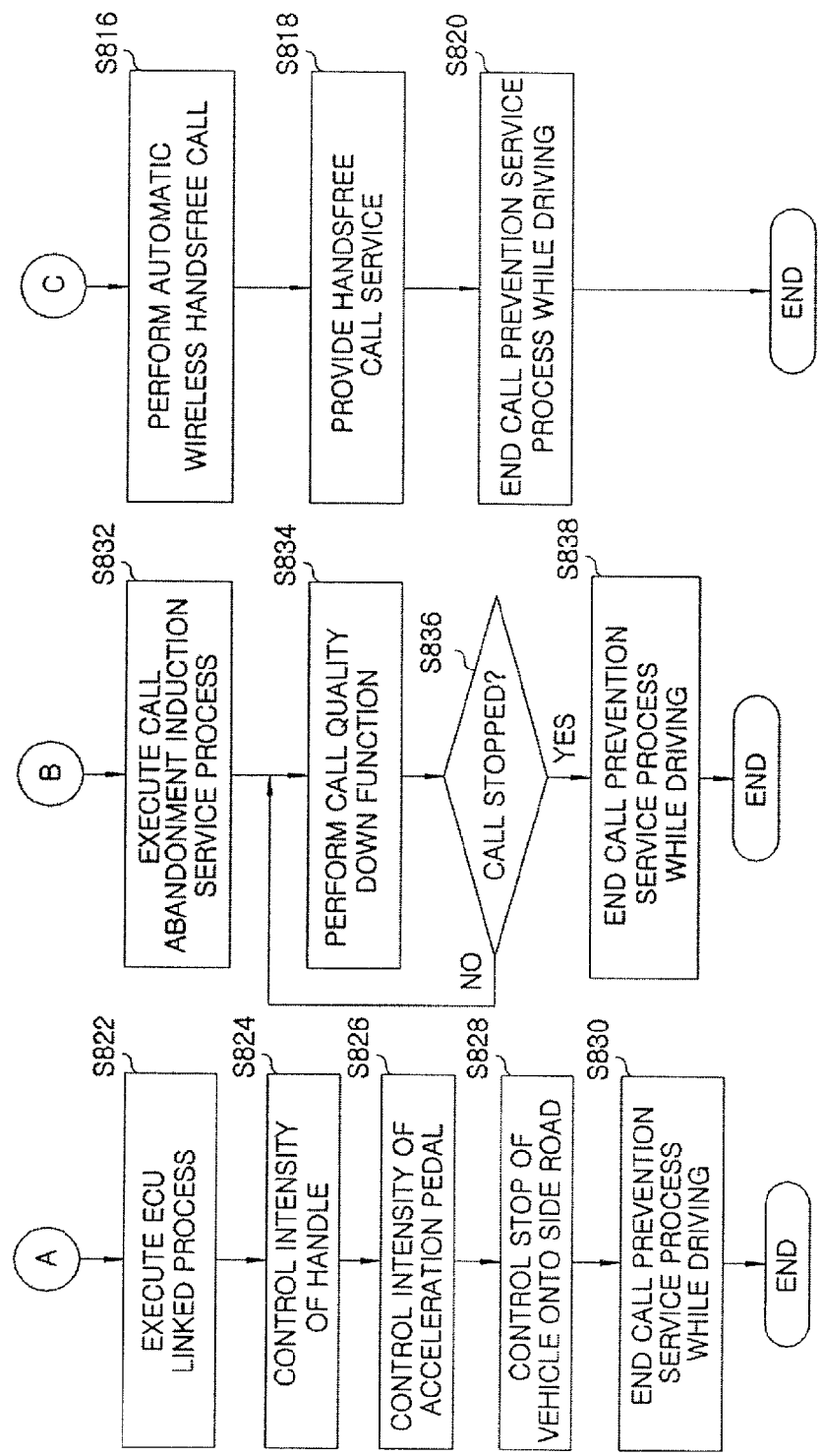

FIG. 12 illustrates a safe driving service operation when the driver is talking over a phone while driving.

When the driver is talking over a mobile phone while driving, the safe driving service apparatus 300 displays a state of talking over a mobile phone while driving onto the vehicle in operation S800, and executes a process for a call prevention service while driving in operation S802, thereby broadcasting guidance for stopping to talk over the mobile phone while driving with the vehicle terminal in operation S804 and inducing a handsfree call in operation S806.

Subsequently, the safe driving service apparatus 300 checks whether the driver voluntarily performs the handsfree call in operation S808.

When it is determined in operation S808 that the driver voluntarily performs the handsfree call, the safe driving service apparatus 300 ends the call prevention service process while driving in operation S810.

However, when it is determined in operation S808 that the driver does not voluntarily perform the handsfree call, the safe driving service apparatus 300 guides or suggests an automatic wireless handsfree call with the vehicle terminal in operation S812, and checks whether to allow the provision of the automatic wireless handsfree call in operation S814.

When it is determined in operation S814 that the provision is allowed, the safe driving service apparatus 300 performs the automatic wireless handsfree call in operation S816, provides a handsfree call service in operation S818, and ends the call prevention service process while driving in operation S820.

When it is determined in operation S814 that the provision is not allowed, the safe driving service apparatus 300 executes the ECU-linked process in operation S822, controls the intensity of the handle in operation S824, controls the reduction in the acceleration pedal in operation S826, controls the stop of the vehicle onto the side road for building a traffic flow and a safe driving environment in operation S828, and ends the ECU-linked call prevention service while driving in operation S830.

Simultaneously, the safe driving service apparatus 300 executes a call abandonment induction service process in operation S832, performs a call quality down function to induce the stop of the call in operation S834, and checks whether the driver abandons talking over a mobile phone while driving in operation S836.

When it is checked in operation S836 that the driver does not abandon talking over the mobile phone while driving, the safe driving service apparatus 300 continuously performs the call quality down function until a call is ended.

When it is checked in operation S836 that the driver abandons talking over the mobile phone while driving, the safe driving service apparatus 300 ends the ECU-linked call prevention service process while driving in operation S838.

In accordance with an embodiment of the present invention, the safe driving service technology for vehicle based on emotion automatically cognizes the emotion of a driver and passenger and the conditions of a vehicle, thus preventing the occurrence of a dangerous situation or a criminal situation. Furthermore, by respectively disposing the multi-emotion sensor nodes in a handle, seat, transmission, ceiling and the like of a vehicle, the embodiment senses environment signals and bio signals that are generated through the reaction of a person's autonomic nervous system in a driving environment to thereby cognize the emotions and driving conditions of a driver and passenger, and provides a safe driving control and service based on the cognized emotion information.

In accordance with the present invention, by implementing a protective/safe driving system with emotion recognition technology applied thereto, vehicles are not used as a simple moving means but can be used as tools that care and manage the health or emotion condition of a person, and as in smart phones, the values of vehicles that are used as life tools specialized for respective users can more increase. Also, a vehicle cognizes the emotion conditions of a driver and fellow passenger and uses the cognized conditions for safe driving, thus decreasing traffic accidents. Furthermore, the present invention prevents various vehicle-related crimes, and quickly detects the occurrence of a crime, thus reducing a crime rate.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An emotion-based vehicle service system for safe driving, including:
   a multi-emotion sensor node configured to sense emotion information of a user in a vehicle and condition information of the vehicle;
   an emotion cognition processing apparatus configured to analyze sensing information provided from the multi-emotion sensor node to generate emotion cognition information for cognizing the emotion of the user; and
   a safe driving service apparatus configured to provide an emotion-based safe driving service depending on the emotion cognition information,
   wherein the safe driving service apparatus is configured to:
   display a drowsy driving state when a current condition of the driver is in the drowsy driving state;
   execute an ECU-linked process for controlling safe driving in the drowsy driving state to control a reduction in a vehicle speed, an intensity of a handle, or an intensity of a pedal in accordance with a drowsy intensity;
   perform a drowsy emotion service to perform guide broadcasting to a drowsy state with a vehicle terminal and ventilate air in the vehicle through the control of an air conditioning system;
   provide a music service for awaking drowsiness, and performing guide broadcasting for inducing parking of the vehicle onto a side road;
   continuously monitor a drowsy state to induce parking of the vehicle onto the side road in operational connection to a maneuver patrol when the drowsy state is continuously maintained;
   control parking of the vehicle onto the side road to stop drowsy driving by linking up with the ECU; and
   inform the driver being awaked from the drowsy state to a drivable state.

2. The emotion-based vehicle service system of claim 1, wherein the multi-emotion sensor node is constituted with at least one of a handle sensor node, a driver seat sensor node, a passenger seat sensor node, a transmission sensor node, a ceiling sensor node, and a front glass sensor node.

3. The emotion-based vehicle service system of claim 2, wherein the multi-emotion sensor node includes at least one of a heart rate sensor, a skin reaction sensor, a body temperature sensor, a voice sensor, an image sensor, an acceleration sensor, and a slope sensor.

4. The emotion-based vehicle service system of claim 1, wherein the emotion cognition processing apparatus is further configured to combine the emotion information of the user and the condition information of the vehicle for analyzing the combined emotion information and the condition information to cognize the emotion of the user.

5. A safe driving service method of a multi-emotion sensor node including a plurality of sensors, the safe driving service method including:
   recognizing a driver and a passenger in a vehicle to objectify a sensing target;
   sensing emotion cognition information using the plurality of sensors, wherein the emotion cognition information includes emotion information of the driver and passenger and condition information of the vehicle;
   analyzing the emotion cognition information;
   performing a safe driving service based on the analyzed emotion cognition information;
   converting the analyzed emotion cognition information into message information; and
   transmitting the message information corresponding to the emotion cognition information to an emotion recognition processing apparatus over a network,
   wherein said performing the safe driving service includes:
   displaying a drowsy driving state when a current condition of the driver is in the drowsy driving state;
   executing an ECU-linked process for controlling safe driving in the drowsy driving state to control a reduction in a vehicle speed, an intensity of a handle, or an intensity of a pedal in accordance with a drowsy intensity;
   performing a drowsy emotion service to perform guide broadcasting to a drowsy state with a vehicle terminal and ventilate air in the vehicle through the control of an air conditioning system;
   providing a music service for awaking drowsiness, and performing guide broadcasting for inducing parking of the vehicle onto a side road;
   continuously monitoring a drowsy state to induce parking of the vehicle onto the side road in operational connection to a maneuver patrol when the drowsy state is continuously maintained;
   controlling parking of the vehicle onto the side road to stop drowsy driving by linking up with the ECU; and
   informing the driver being awaked from the drowsy state to a drivable state.

6. The safe driving service method of claim 5, wherein the sensors include one or more a heart rate sensor, a skin reaction sensor, a body temperature sensor, a voice sensor, an image sensor, and an acceleration and slope sensor.

7. The safe driving service method of claim 6, wherein said analyzing the emotion cognition information includes:
   analyzing a plurality of signals sensed by the heart rate sensor to detect an HRV/pulse wave, a hematocele oxidization saturation, and intensity of a hematocele;
   analyzing a plurality of signals sensed by the skin reaction sensor to detect a skin conductance;
   analyzing a signal sensed by the body temperature sensor to detect a skin temperature;
   analyzing a signal sensed by the voice sensor to detect voice and a sound wave;
   analyzing a signal sensed by the image sensor to detect conditions of a pupil and face; and
   analyzing a signal sensed by the acceleration and slope sensor to detect a motion and an activity.

8. An emotion-based safe driving service apparatus, including:
   a vehicle terminal user interface (UI) configured to provide a UI environment of the safe driving service apparatus;
   an emotion information management module configured to manage emotion cognition information provided thereto;
   an engine control unit (ECU)-linked safe driving control module configured to control ECU-linked safe driving of a vehicle in accordance with to the emotion cognition information managed by the emotion information management unit; and
   an emotion care safe driving service module configured to provide an emotion care safe driving service to the vehicle when the vehicle based on the emotion cognition information is controlled by the ECU-linked safe driving control module, wherein the emotion care safe driving service module includes:
   a vehicle external UI platform;
   a guide broadcaster configured to provide emotion care-related information around a vehicle;
   an emotion care audio servicer configured to provide emotion care-related audio information;
   an emotion care video servicer configured to providing emotion care-related video information;
   a vehicle condition image transmitter configured to provide real-time traffic information around the vehicle as an image;
   a vehicle condition information message processor configured to process an operation of sending an emergency report message, a message for reporting to an emergency service center, or a message for sending notice information to an acquaintance;
   an illumination setter configured to set emotion care-related illumination; and
   a ventilation adjuster configured to adjust air ventilation associated with emotion care around the vehicle.

9. The emotion-based safe driving service apparatus of claim 8, wherein the emotion information management module includes:
   a user emotion information manager;
   an engine control unit (ECU) linker;
   a vehicle condition information manager;
   a personal terminal linkage manager; and
   an external network connection interface.

10. The emotion-based safe driving service apparatus of claim 8, wherein the ECU-linked safe driving control module includes:
   a handle controller,
   an acceleration pedal controller;
   a break controller;
   a starting lock controller;
   an automatic vehicle speed reduction controller; and
   an automatic vehicle stop controller.

11. A safe driving service method of an emotion-based safe driving service apparatus, the safe driving service method including:
   classifying a sensing signal received from a multi-emotion sensor node;
   analyzing the classified sensing signal depending on characteristic;
   applying an emotion inference algorithm to a driver and a passenger in a vehicle in accordance with the analyzed result to extract emotion information of the driver and passenger;

analyzing the classified sensing signal depending on characteristic of the sensor node to extract condition information of the vehicle;

analyzing the emotion information of the driver and passenger and the condition information of the vehicle to provide the analyzed result for a safe driving service; and performing a selective safe driving service depending on the analyzed result, wherein said performing the selective safe driving service includes:

displaying a drowsy driving state when a current condition of the driver is in the drowsy driving state;

executing an ECU-linked process for controlling safe driving in the drowsy driving state to control a reduction in a vehicle speed, an intensity of a handle, or an intensity of a pedal in accordance with a drowsy intensity;

performing a drowsy emotion service to perform guide broadcasting to a drowsy state with a vehicle terminal and ventilate air in the vehicle through the control of an air conditioning system;

providing a music service for awaking drowsiness, and performing guide broadcasting for inducing parking of the vehicle onto a side road;

continuously monitoring a drowsy state to induce parking of the vehicle onto the side road in operational connection to a maneuver patrol when the drowsy state is continuously maintained;

controlling parking of the vehicle onto the side road to stop drowsy driving by linking up with the ECU; and informing the driver being awaked from the drowsy state to a drivable state.

12. A safe driving service method of an emotion-based safe driving service apparatus, the safe driving service method including:

classifying a sensing signal received from a multi-emotion sensor node;

analyzing the classified sensing signal depending on characteristic;

applying an emotion inference algorithm to a driver and a passenger in a vehicle in accordance with the analyzed result to extract emotion information of the driver and passenger;

analyzing the classified sensing signal depending on characteristic of the sensor node to extract condition information of the vehicle;

analyzing the emotion information of the driver and passenger and the condition information of the vehicle to provide the analyzed result for a safe driving service; and performing a selective safe driving service depending on the analyzed result, wherein said performing the selective safe driving service includes:

displaying a driver-fatigued state when a current condition of the driver is a fatigued or health-deteriorated state;

executing a safe driving service process in accordance with a health condition of the driver to perform guide broadcasting for a fatigue and health condition with a vehicle terminal and display the health condition on the vehicle terminal;

determining whether the fatigue and health condition reaches an undrivable threshold;

reporting to an emergency service when it is determined that the fatigue and health condition of the driver is an undrivable state;

collecting position information of the vehicle;

notifying an acquaintance of a health-deteriorated state; and executing an ECU-linked process for controlling safe driving in a fatigued state to control a safe speed of the vehicle and control safe driving to a destination in operational connection with a vehicle terminal navigation when it is determined that the fatigue and health condition of the driver is not the undrivable state.

13. A safe driving service method of an emotion-based safe driving service apparatus, the safe driving service method including:

classifying a sensing signal received from a multi-emotion sensor node;

analyzing the classified sensing signal depending on characteristic;

applying an emotion inference algorithm to a driver and a passenger in a vehicle in accordance with the analyzed result to extract emotion information of the driver and passenger;

analyzing the classified sensing signal depending on characteristic of the sensor node to extract condition information of the vehicle;

analyzing the emotion information of the driver and passenger and the condition information of the vehicle to provide the analyzed result for a safe driving service; and performing a selective safe driving service depending on the analyzed result, wherein said performing the selective safe driving service includes:

displaying a drunk driving state when a current condition of the driver is a drunk driving state;

executing a drunk driving prevention service process to display an alcohol concentration with a vehicle terminal;

providing guide broadcasting for warning against drunk driving with the vehicle terminal;

determining whether the vehicle is currently stopped;

executing an ECU-linked process to control parking of the vehicle onto a side road and control a starting lock such that the driver cannot drive the vehicle in the drunk state any longer, when it is determined that the vehicle is continuously driven;

collecting position information of the vehicle; and notifying a maneuver patrol of the collected position information.

14. A safe driving service method of an emotion-based safe driving service apparatus, the safe driving service method including:

classifying a sensing signal received from a multi-emotion sensor node;

analyzing the classified sensing signal depending on characteristic;

applying an emotion inference algorithm to a driver and a passenger in a vehicle in accordance with the analyzed result to extract emotion information of the driver and passenger;

analyzing the classified sensing signal depending on characteristic of the sensor node to extract condition information of the vehicle;

analyzing the emotion information of the driver and passenger and the condition information of the vehicle to provide the analyzed result for a safe driving service; and performing a selective safe driving service depending on the analyzed result, wherein said performing the selective safe driving service includes:

displaying a reckless driving state of the driver;

executing a reckless driving prevention service process to provide guide broadcasting for warning against reckless driving with the vehicle terminal, when a current condition of the driver is an angry state;

checking whether the driver is continuously performing reckless driving;

executing an ECU-linked process to control an intensity of a handle and control an intensity of an acceleration pedal, when it is checked that the driver is continuously performing the reckless driving;

reproducing an emotion care music;

notifying a maneuver patrol of information on a reckless-driving vehicle in automatic connection with the maneuver patrol; and collecting position information of the vehicle to notify the maneuver patrol of the collected position information.

15. A safe driving service method of an emotion-based safe driving service apparatus, the safe driving service method including:

classifying a sensing signal received from a multi-emotion sensor node;

analyzing the classified sensing signal depending on characteristic;

applying an emotion inference algorithm to a driver and a passenger in a vehicle in accordance with the analyzed result to extract emotion information of the driver and passenger;

analyzing the classified sensing signal depending on characteristic of the sensor node to extract condition information of the vehicle;

analyzing the emotion information of the driver and passenger and the condition information of the vehicle to provide the analyzed result for a safe driving service; and performing a selective safe driving service depending on the analyzed result, wherein said performing the selective safe driving service includes:

displaying a feared state in the vehicle;

executing a rescue service process for rescuing the driver from the feared state to provide a service which protects the driver from fear, when it is determined that the driver or the passenger has a sensation of fear;

collecting real-time image or voice data on situations inside the vehicle;

automatically reporting to a maneuver center, maneuver center, or maneuver patrol center a maneuver patrol;

sending the collected data to the maneuver center, maneuver center, or maneuver patrol center in real time;

collecting position information of the vehicle;

sending the collected position information to the maneuver center, maneuver center, or maneuver patrol center in real time;

analyzing, by maneuver center, maneuver center or maneuver patrol center, the situations and position information to determine whether it is required to control a track and stop of the vehicle;

reiteratively performing the operations until the feared state is removed, when it is determined that controlling the stop of the vehicle is not required; and executing an ECU-linked process to control the stop of the vehicle and control a starting lock until the maneuver center, maneuver center, or the maneuver patrol arrives, when it is determined that controlling the stop of the vehicle is required.

16. A safe driving service method of an emotion-based safe driving service apparatus, the safe driving service method including:

classifying a sensing signal received from a multi-emotion sensor node;

analyzing the classified sensing signal depending on characteristic;

applying an emotion inference algorithm to a driver and a passenger in a vehicle in accordance with the analyzed result to extract emotion information of the driver and passenger;

analyzing the classified sensing signal depending on characteristic of the sensor node to extract condition information of the vehicle;

analyzing the emotion information of the driver and passenger and the condition information of the vehicle to provide the analyzed result for a safe driving service; and performing a selective safe driving service depending on the analyzed result, wherein said performing the selective safe driving service includes:

displaying a state of talking over a phone while driving;

executing a call prevention service process while driving to broadcast guidance for stopping to talk over the phone while driving with the vehicle terminal and induce a handsfree call, when the driver is talking over the phone while driving;

checking whether the driver voluntarily performs the handsfree call;

guiding provision of an automatic wireless handsfree calling with a vehicle terminal;

checking whether to allow provision of the automatic wireless handsfree calling, when it is determined that the driver does not voluntarily perform the handsfree call;

performing the automatic wireless handsfree calling to provide a handsfree call service, when it is determined that the provision is allowed;

executing an ECU-linked process to control an intensity of a handle, control a reduction in an acceleration pedal, and control stop of the vehicle onto a side road for building a traffic flow and a safe driving environment, when it is determined that the provision is not allowed;

executing a call abandonment induction service process to perform a call quality down function to induce stop of a call;

checking whether the driver abandons talking over a phone while driving; and continuously performing the call quality down function until a call is ended when it is checked that the driver does not abandon talking over the phone while driving.

* * * * *